(12) United States Patent
Dronzkowski et al.

(10) Patent No.: US 7,870,730 B2
(45) Date of Patent: *Jan. 18, 2011

(54) VARIABLE GEOMETRY TURBOCHARGER EXTENDER IDLE VANE CYCLE

(75) Inventors: David Joseph Dronzkowski, Sterling Heights, MI (US); Matthew Thomas Baird, Canton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 540 days.

This patent is subject to a terminal disclaimer.

(21) Appl. No.: 11/958,659

(22) Filed: Dec. 18, 2007

(65) Prior Publication Data

US 2009/0151354 A1 Jun. 18, 2009

(51) Int. Cl.
*F02D 23/00* (2006.01)
*F02B 39/16* (2006.01)
*F02G 3/00* (2006.01)

(52) U.S. Cl. .......................................... 60/602; 60/619

(58) Field of Classification Search ................. 60/602, 60/619; 415/117; F02B 39/16, 37/12, 77/08; F02C 7/00
See application file for complete search history.

(56) References Cited

U.S. PATENT DOCUMENTS

| 4,482,365 | A | 11/1984 | Roach |
| 4,548,040 | A | 10/1985 | Miller et al. ................. 60/619 |
| 5,944,483 | A | 8/1999 | Beck et al. .................. 415/117 |
| 2008/0035112 | A1* | 2/2008 | Yamaguchi et al. ...... 123/559.1 |
| 2009/0151351 | A1* | 6/2009 | Zurawski et al. ............. 60/602 |
| 2009/0313991 | A1* | 12/2009 | Kuznicki et al. ........... 60/605.1 |

FOREIGN PATENT DOCUMENTS

| EP | 1304462 | A2 * | 4/2003 |
| JP | 2000265846 | A * | 9/2000 |
| JP | 2001132466 | A * | 5/2001 |
| JP | 2003293784 | A * | 10/2003 |
| JP | 2006105017 | A * | 4/2006 |
| KR | 2006098960 | A * | 9/2006 |

* cited by examiner

*Primary Examiner*—Thai Ba Trieu
(74) *Attorney, Agent, or Firm*—Bill C. Panagos; Rader, Fishman & Grauer PLLC

(57) ABSTRACT

A method to operate and electronic controlled internal combustion engine, and particularly a heavy duty diesel engine, to effect vane cleaning of a variable geometry turbocharger.

12 Claims, 5 Drawing Sheets

VARIABLE GEOMETRY TURBOCHARGER EXTENDER IDLE VANE CYCLE

BACKGROUND OF THE INVENTION

1. Field of the Invention

The present invention relates to a method for determining the necessity of instituting multiple vane cleaning procedures for a turbocharger subjected to exhaust gasses.

The present invention further relates to a method for determining the necessity of instituting multiple vane cleaning procedures for a variable geometry turbocharger subjected to exhaust gasses.

The present invention further relates to a method to operate an electronic controlled internal combustion engine equipped with an ECU having memory and a turbocharger, to effect cleaning of the turbocharger vanes.

The present invention further relates to a method to operate an electronic controlled heavy duty diesel engine equipped with an electronic control unit (ECU) having a memory and a variable geometry turbocharger to determine whether to effect cleaning of the vanes.

2. Description of the Related Art

Miller, et al., U.S. Pat. No. 4,548,040 discloses a method and apparatus for determining when to initiate cleaning of a turbine blade of a turbocharger. The performance of the compressor portion of the turbocharger is monitored and upon a degradation of performance being detected it is indicated that fouling of the turbine blades has occurred. In response to this indication, a water injection system is energized for supplying atomized water under high pressure to the exhaust gas, powering the turbocharger to effectively clean the turbine blades. Means are provided for decreasing the speed of the turbocharger during the cleaning cycle to allow for effective cleaning operation. Miller, et al., '040 monitors the performance of the turbocharger compressor and upon degradation of the performance, makes a determination that cleaning is necessary.

Beck, et al. U.S. Pat. No. 5,944,483 discloses a method for wet cleaning of the nozzle rings of an exhaust gas turbocharger turbine based on thermal shock of the contaminants and includes the steps of injected water in repeated relatively short amounts into the exhaust duct immediately upstream of the nozzle ring. A delay between injections allows the nozzle ring to reheat to operating temperature so that each water injection causes a thermal shock. An apparatus to perform the method includes water injection nozzles installed in the exhaust gas casing and a control system. The method and apparatus provide improved cleaning using less water than in known methods.

SUMMARY OF THE INVENTION

The present invention is directed to a method of initiating cleaning procedures of a multiple vane turbocharger subjected to exhaust gases. The method includes determining whether a predetermined period of time has elapsed from a set percent of turbocharger operation, and cycling the turbocharger a predetermined number of times to clean said vanes when said predetermined period of time has elapsed from said set point. A warning indicator may be activated after a predetermined number of cycles to alert an operator that said turbocharger vanes are not clean.

Preferably, the turbocharger is a variable geometry turbocharger (VGT) and the method includes moving each vane to a predetermined position to cycle each vane during cleaning of the turbocharger. The vanes are cleaned by cycling the position of the vanes in the turbocharger during turbocharger operation. It is further understood that the vane cleaning procedures set forth herein may be instituted during idle and Power Take Off (PTO), idle, or any other operation mode of the engine.

The present invention is further directed to a method to operate an electronic controlled internal combustion engine equipped with an electronic controller having memory and equipped with a turbocharger. The method includes determining whether a predetermined period of time has elapsed from set point; determining operating state of engine; cycling the turbocharger vanes a predetermined number of times based upon state of engine operation.

The electronic controller has a timer resident in memory to initiate turbocharger cleaning. The turbocharger is preferably a variable geometry turbocharger (VGT) and the method includes positioning the vanes in the variable geometry turbocharger conducive to cleaning during cycling. The turbocharger may be cycled responsive to engine torque and/or engine speed. During cycling, the vanes are in a first position when the engine is operating at idle and the vanes are in a second position when said engine is operating during Power Take Off (PTO) mode.

It is also contemplated that the method for operating an engine include disabling diagnostic checks of air flow, boost pressure and general plausibility checks.

During cycling, the engine throttle is in full open position and the engine EGR valve is in full closed position. In addition, fuel injection parameters are modified based upon a weighting factor. The engine is operated for a sufficient period of time to ensure that the engine is in a steady state prior to initiating cleaning of the vanes. When cleaning is completed, the timer is reset. In addition, the timer may be reset by initiating a new ignition cycle or a change in engine operating mode (idle, idle PTO mode) or a stepped change in commanded vane position.

DETAILED DESCRIPTION OF PREFERRED EMBODIMENTS

Figure 1:
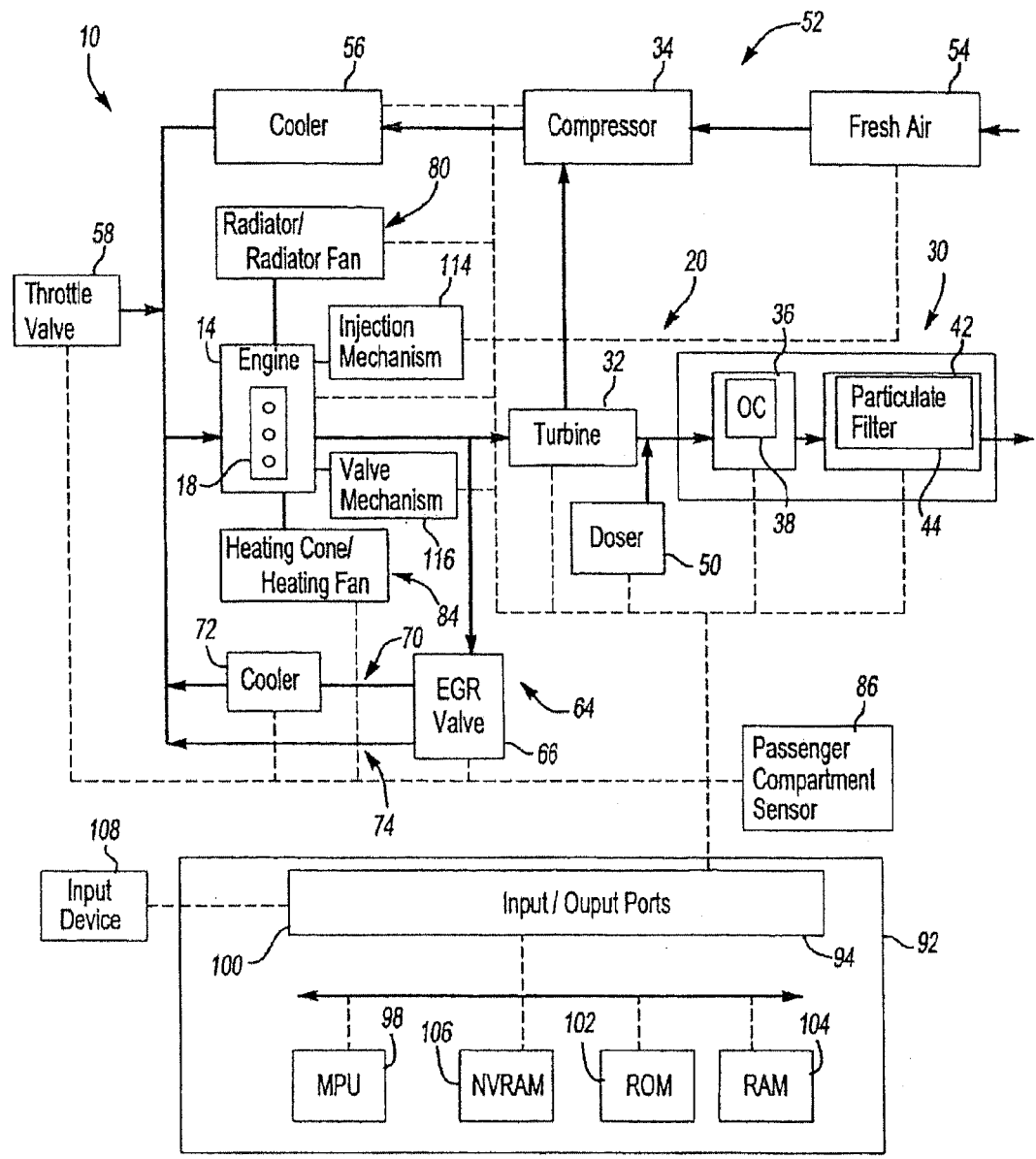
FIG. 1 is a schematic representation of an electronic controlled internal combustion engine with at electronic control unit (ECU) and equipped with a variable geometry turbocharger.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust oases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust oases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

A air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating, demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, may be configured for permanently storing emission related fault codes in memory that is not accessible to unauthorized service tools. Authorized service tools may be given access by a password and in the event access is given, a log is made of the event as well as whether any changes that are attempted to made to the stored fault codes. It is contemplated that any number of faults may be stored in permanent memory, and that preferably eight such faults are stored in memory.

Figure 2B:
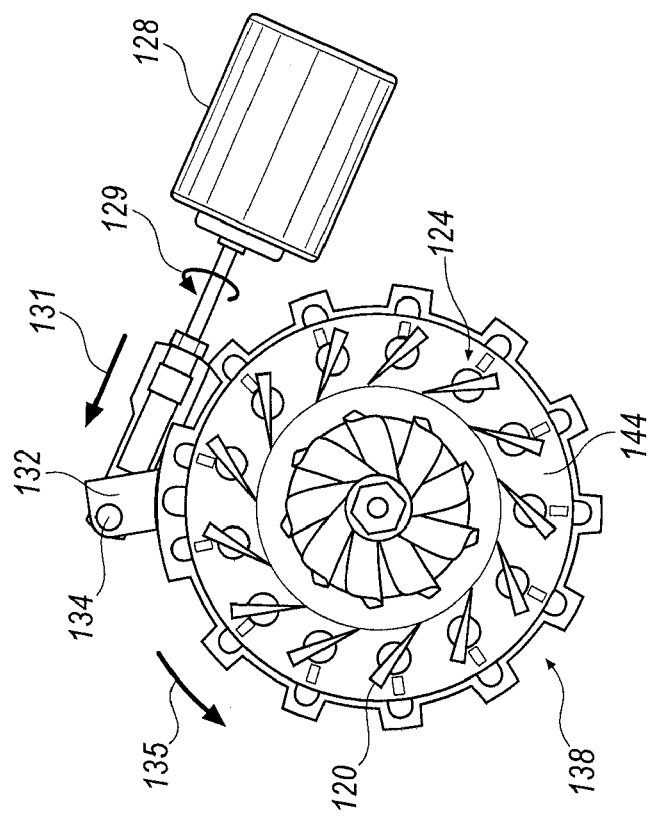
FIG. 2B is a representation of another view of the variable geometry turbocharger in FIG. 2A.
Figure 2A:
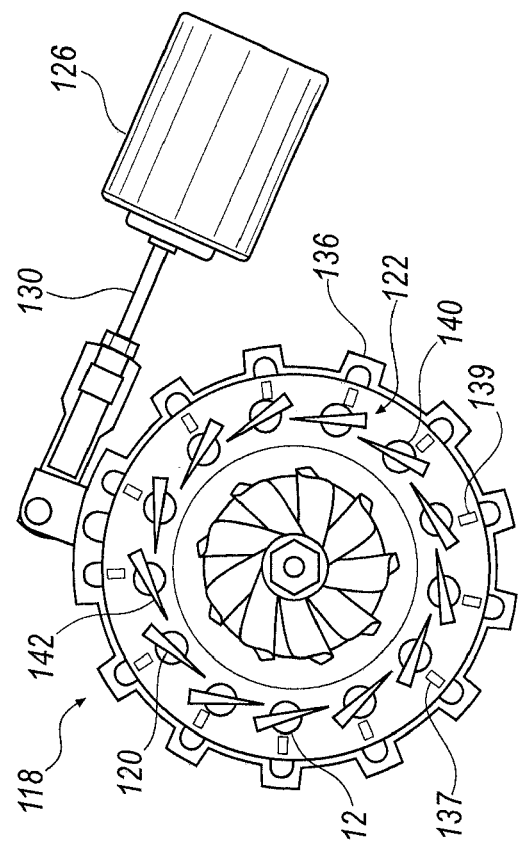
FIG. 2A is a representation of one type of variable geometry turbocharger useful in the present invention.

FIGS. 2A and 2B are a close-up schematic representation of one type of variable geometry turbocharger useful in the present invention. Specifically, variable geometry turbocharger 118 has a plurality of pivotably adjustable vanes 120 from a close position 122 to an open position 124. The vanes are adjusted by a electric motor 126 comprised of a housing 128 with an armature in the housing (not shown) that rotates shaft 130 in response to signals from the ECU indicative of changes in pressure. The rotation of the armature causes shaft 130 to rotate in direction 129 and exert force 131 on flange 132 by pivot 134 using a mechanism as is conventional for translating rotation of a shaft into linear direction 131, to cause ring 136 to rotate in direction 135 about the perimeter 138 of the turbocharger. The vanes are pivotably attached at 137 via linkage 139 to the ring and are moved pivotably about their longitudinal axis 140 to change position from a low vane output position 142 to a high vane output position 144. The amount of movement of the vanes from a normal operation to a low output position and a high output position are of equal quantities and opposite to each other relative to normal position. To vary the vane output, the vanes are pivotably adjusted an equal and opposite amount relative normal operation in order to reach low output and high output.

Figure 3A:
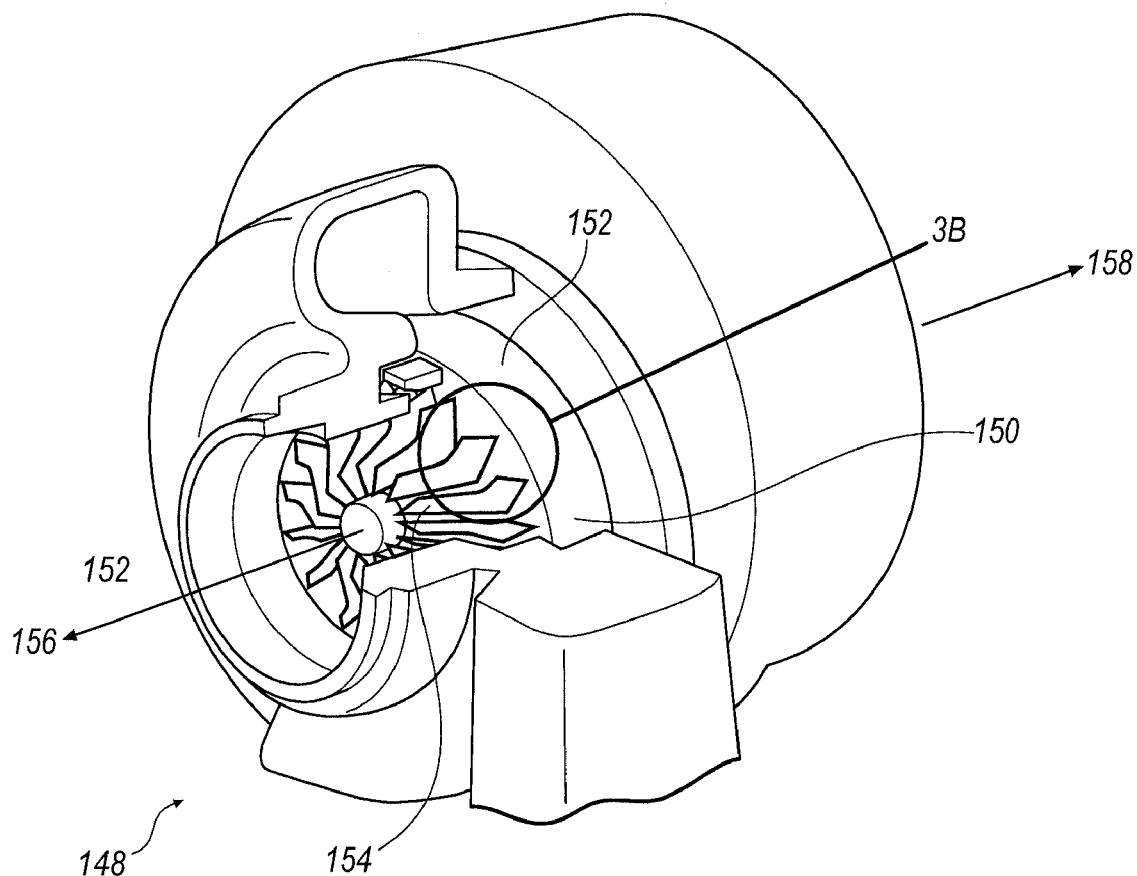
FIG. 3A is a schematic representation of another variable geometry turbocharger.
Figure 3B:
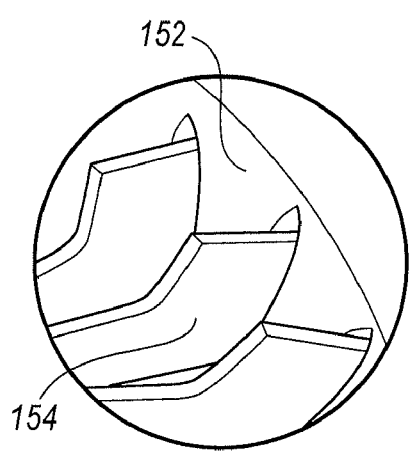
FIG. 3B is a detailed view of the nozzle ring detailed in FIG. 3A.

FIG. 3A is a schematic representation of another variable geometry turbocharger 148 having a nozzle ring 150 with apertures 152 that are slightly larger and accommodate vanes 154 of turbocharger 148 as seen in FIG. 3B. The nozzle ring is movable relative the vanes in directions 156, 158 by means of a electric motor that is similar to construction to that described in relation to FIGS. 2A and 2B. It differs from FIGS. 2A and 2B because the electric motor moves the nozzle ring in the direction 156 and 158 to clean soot from the vanes by the physical action of the aperture against the vanes to remove the soot from the vanes. Vane output is modified by moving the nozzle ring relative its position during normal operation of the turbocharger. Relative the normal operating position, the nozzle ring may be moved in an equal distance to a larger vane output position and in an opposite but equal distance to a low vane output position.

Figure 4A:
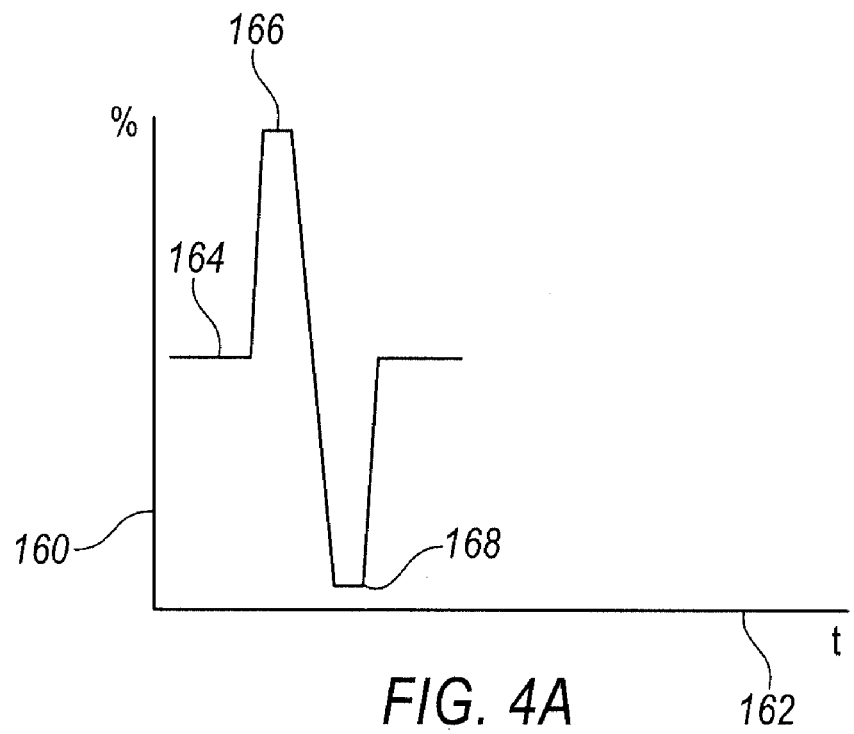
FIGS. 4A and 4B are schematic graphic representation of the change in vane output according to the present invention.
Figure 4B:
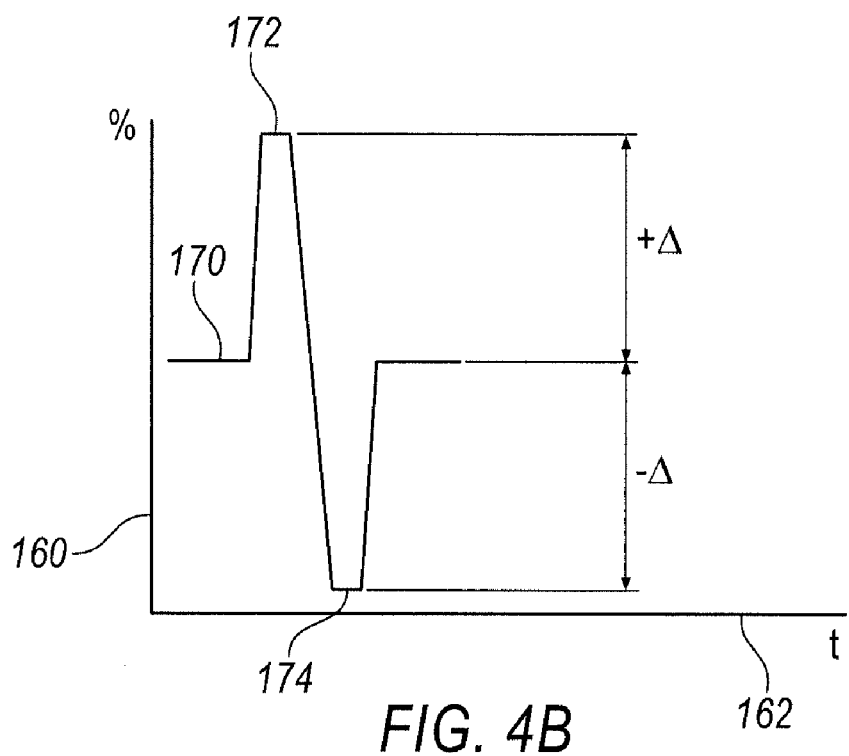

FIGS. 4A and 4B are schematic graphic representations of the change in vane out according to the present invention. Axis 160 is the percent of vane output and axis 162 is time. Normal vane output, corresponding to normal turbocharger operation is represented at 164. During cycling, the vane output is charged within predetermined absolute values 166 and 168, respectively. Value 166 represents the highest vane output and value 168 represents the lowest vane output. During cycling the turbocharger vane output is cycled from high to low and then resumes normal output at some point in time.

FIG. 4B is a representation of an actual operation of a variable geometry turbocharger according to the present invention. The normal operational status is represented at 170, which shows normal operation fluctuating in vane output. During cycling, vane output is changed by a value +Δ to the high vane output represented at 172. The low vane output is changed relative normal operation by a value −Δ, represented at 174. Note that +Δ and −Δ are the same quantity but opposite or negative each other relative to normal engine operations.

Figure 5:
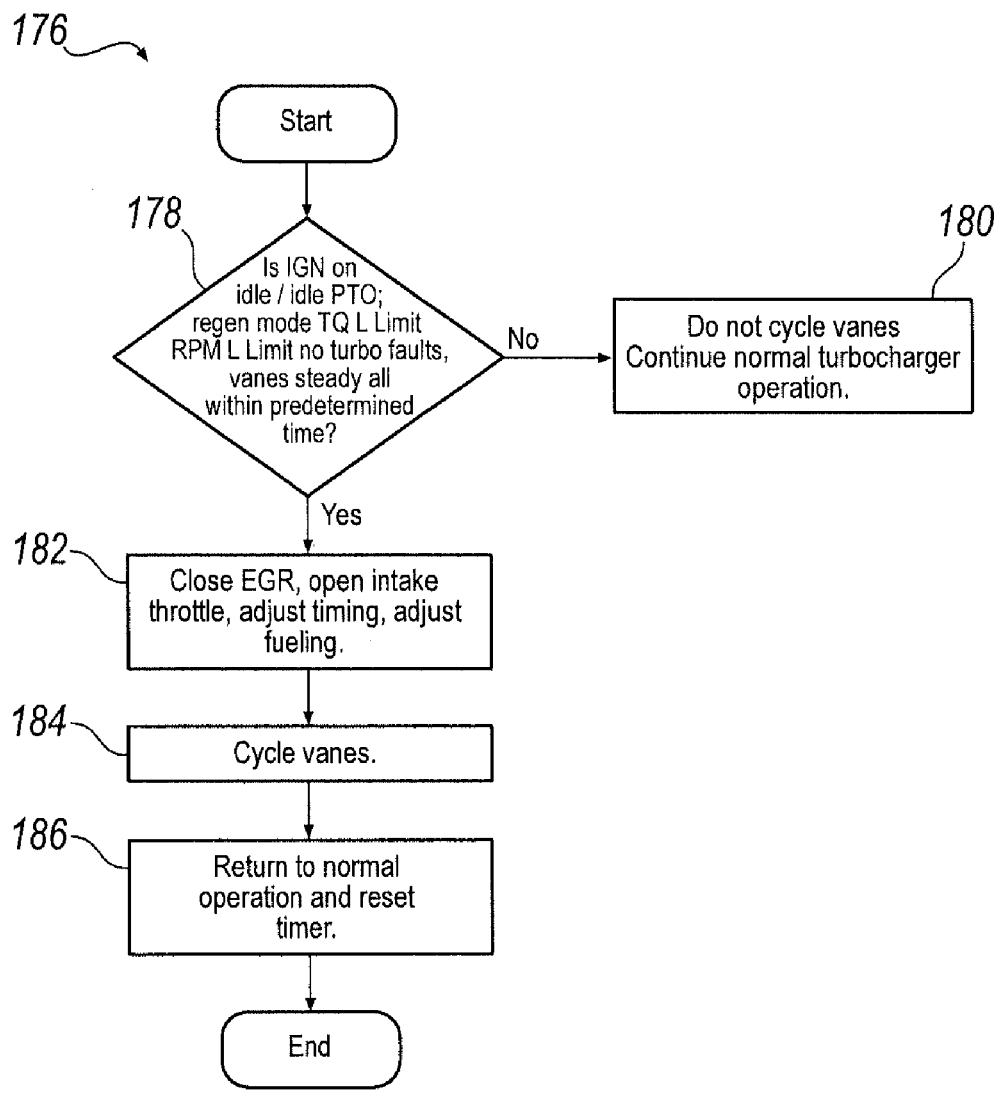
FIG. 5 is a schematic representation of a software flowchart of one method according to the present invention.

FIG. 5 is a schematic representation of a software flow charge of one method 176 according to the present invention. Step 178 is determining the operation status of the engine and simultaneously determining the operational status of the turbocharger. In determining the operational stares of the engine, the ECM simultaneously determines whether the ignition is on, whether the engine is operating in idle, Power Take Off, or idle and Power Take Off, whether the engine is in regeneration mode for some aspect of the exhaust components, such as whether the engine is dosing fuel into a diesel particulate filter in the case of a compression ignition engine during diesel particulate filter regeneration, whether the engine torque exceeds a predetermined calibratable limit value, whether the engine speed or RPM exceeds a predetermined calibratable limit. In addition, the turbocharger operational status is determined simultaneously. The ECM determines whether the vanes are steady and whether there are any turbocharger faults. All the actions in step 178 proceed simultaneously within a predetermined calibratable time period. If any one of these determination is contrary to vane cleaning, the method steps and normal turbocharger operation continues, as at 180.

Step 182 is optional, and occurs only if all determinations in step 178 are favorable and compatible with vane cleaning. Step 182 includes the simultaneous action of closing the EGR valve, opening the intake throttle adjusting engine timing and adjusting fueling.

Step 184 is cycling the vanes to clean them of soot. In this step, the output of the vanes is cycled from a high output valve to a low output valve relative to normal output valve as previously described in relation to FIGS. 2A through 4B. The vanes are cycled for a predetermined calibratable period of time and the engine resumes normal operation as indicated at step 186 and the timer is reset.

The words used to describe this invention are words of description, and not words of limitation. Those skilled in the art recognize that many variations and modifications are possible without departing form the scope and spirit of the invention as set forth in the appended claims.

What is claimed as new and desired to be protected by Letters Patent of the United States is:

1. A method of controlling cycling vanes in a variable geometry turbocharger for an internal combustion engine including a controller, the method including:
   determining an operational status of said engine while simultaneously determining whether turbocharger faults exist and whether a predetermined period of time has passed since the vanes were last cycled;
   if the operational status of the engine is regeneration, idle, Power Take Off, or idle and Power Take Off and if turbocharger exist and if the predetermined period of time has passed, permitting cycling;
   cycling said vanes in said turbocharger for a predetermined number of times to clean said vanes; and
   after cycling said vanes, setting said turbocharger to a normal operation.

2. A method for cleaning soot deposits from at least one vane of a variable geometry turbocharger equipped with a vane actuator; said turbocharger exposed to an electronic controller of an internal combustion engine having an exhaust stream, comprising:
   determining an operational status of said engine while simultaneously determining an operational status of said turbocharger within a predetermined period of time according to a timer;
   if the operational status of the engine is idle, Power Take Off, or idle and Power Take Off and if the operational status of said turbocharger is not normal operation, permitting cycling of said vanes;
   cycling said vanes in said turbocharger for a predetermined number of times; and
   after cycling said vanes, setting said turbocharger to a normal operation and resetting said timer.

3. The method of claim 2, wherein the permitting cycling step does not occur unless engine torque exceeds a calibratable predetermined limit or engine speed exceeds a calibratable predetermined limit or both.

4. The method of claim 2, wherein determining said operational status of the turbocharger includes simultaneously determining whether there are any turbocharger faults and determining whether said vanes are in a steady state.

5. The method of claim 2, further including, before cycling, simultaneously closing engine EGR valve; opening engine intake throttle; adjusting engine timing and adjusting engine fueling.

6. The method of claim 2, wherein said vane actuator is a nozzle ring that has apertures to accommodate said vanes when said nozzle ring is moved relative to said vanes during cycling to remove soot deposits from said vanes.

7. The method of claim 2, wherein said vane actuator is a series of armatures; each of said armatures pivotally actuating an individual vane along a longitudinal access to move said vane from first position to a second position to maximize air flow over said vanes during cycles to clean soot from said vanes.

8. The method of claim 7, wherein said cycling includes rotating said turbocharger vane assembly at a calibratable predetermined accelerated rate for a calibratable predetermined period of time.

9. The method of claim 2, wherein said cycling includes varying the output of the turbocharger up to a calibratable predetermined absolute value to effect cleaning of said vanes.

10. The method of claim 9, wherein turbocharger output is adjusted from a normal output vane position to a low output vane position to a high output vane position; said low and high outputs being equal quantities but negative values relative to each other.

11. The method of claim 2, wherein cycling occurs when said engine is operating in a regeneration mode for an exhaust component to be regenerated.

12. The method of claim 1, wherein turbocharger output is adjusted from a normal output vane position to a low output vane position to a high output vane position; said low and high outputs being equal quantities but negative values relative to each other.

* * * * *